(12) United States Patent
Rock et al.

(10) Patent No.: US 8,546,064 B2
(45) Date of Patent: Oct. 1, 2013

(54) METHOD TO PRODUCE A FUEL CELL FLOWFIELD WITH PHOTOPOLYMER WALLS

(75) Inventors: Jeffrey A. Rock, Fairport, NY (US); Jeff D. Williams, Tonawanda, NY (US); Alan J. Jacobsen, Woodland Hills, CA (US); Peter D. Brewer, Westlake Village, CA (US); William B. Carter, Calabasas, CA (US)

(73) Assignees: GM Global Technology Operations LLC, Detroit, MI (US); HRL Laboratories, LLC, Malibu, CA (US)

( * ) Notice: Subject to any disclaimer, the term of this patent is extended or adjusted under 35 U.S.C. 154(b) by 202 days.

(21) Appl. No.: 13/053,745

(22) Filed: Mar. 22, 2011

(65) Prior Publication Data

US 2012/0244475 A1 Sep. 27, 2012

(51) Int. Cl.
*G03F 7/26* (2006.01)
(52) U.S. Cl.
USPC .......................................................... 430/311
(58) Field of Classification Search
USPC .................................................. 430/319, 320
See application file for complete search history.

(56) References Cited

U.S. PATENT DOCUMENTS

| | | |
|---|---|---|
| 2010/0159294 A1 | 6/2010 | Fly et al. |
| 2010/0159303 A1 | 6/2010 | Rock et al. |
| 2010/0159398 A1 | 6/2010 | Rock et al. |
| 2010/0291465 A1 | 11/2010 | Rock et al. |
| 2010/0291466 A1 | 11/2010 | Rock et al. |
| 2011/0090480 A1 | 4/2011 | Lai et al. |
| 2011/0091813 A1 | 4/2011 | Lai et al. |

*Primary Examiner* — Kathleen Duda
*Assistant Examiner* — Caleen Sullivan
(74) *Attorney, Agent, or Firm* — Fraser Clemens Martin & Miller LLC; J. Douglas Miller (57) ABSTRACT

A method for fabricating a flowfield for a fuel cell includes the steps of: providing a substrate; providing a plurality of radiation sources configured to generate a plurality of radiation beams; disposing a radiation-sensitive material on the substrate; placing an imaging mask between the plurality of radiation sources and the radiation-sensitive material; and exposing the radiation-sensitive material to the plurality of radiation beams through a first portion of the radiation-transparent apertures and a second portion of the radiation-transparent apertures in the imaging mask to form the plurality of truss elements and the plurality of wall elements in the radiation-sensitive material, the truss elements forming a plurality of trusses configured to support an adjacent diffusion medium layer, and the wall elements defining a fluid path along a length of the substrate.

20 Claims, 11 Drawing Sheets

METHOD TO PRODUCE A FUEL CELL FLOWFIELD WITH PHOTOPOLYMER WALLS

FIELD OF THE INVENTION

The present disclosure relates to a fuel cell component and more particularly to a method for fabricating a fuel cell component with radiation-sensitive materials.

BACKGROUND OF THE INVENTION

A fuel cell has been proposed as a clean, efficient and environmentally responsible power source for electric vehicles and various other applications. Individual fuel cells can be stacked together in series to form a fuel cell stack for various applications. The fuel cell stack is capable of supplying a quantity of electricity sufficient to power a vehicle. In particular, the fuel cell stack has been identified as a potential alternative for the traditional internal-combustion engine used in modern automobiles.

One type of fuel cell is the polymer electrolyte membrane (PEM) fuel cell. The PEM fuel cell includes three basic components: an electrolyte membrane; and a pair of electrodes, including a cathode and an anode. The electrolyte membrane is sandwiched between the electrodes to form a membrane-electrode-assembly (MEA). The MEA is typically disposed between porous diffusion media (DM) such as carbon fiber paper, which facilitates a delivery of reactants such as hydrogen to the anode and oxygen to the cathode. In the electrochemical fuel cell reaction, the hydrogen is catalytically oxidized in the anode to generate free protons and electrons. The protons pass through the electrolyte to the cathode. The electrons from the anode cannot pass through the electrolyte membrane, and are instead directed as an electric current to the cathode through an electrical load such as an electric motor. The protons react with the oxygen and the electrons in the cathode to generate water.

It has been desirable to fabricate the fuel cell and related fuel cell components from radiation-sensitive materials. The formation of structures such as micro-truss structures from radiation-sensitive materials are described in Assignee's co-pending U.S. patent application Ser. No. 12/339,308, the entire disclosure of which is hereby incorporated herein by reference. The formation of radiation-cured fuel cell components is further described in Assignee's co-pending U.S. patent application Ser. Nos. 12/341,062, 12/341,105, 12/603,147, 12/466,646, 12/466,405, and 12/603,120, the entire disclosures of which are hereby incorporated herein by reference.

Known flowfield concepts have previously relied on a compressible diffusion media to provide a compliance sufficient to accommodate electrolyte membrane swell during operation of the fuel cell. However, there is a continuing need for an efficient system and method for producing a flowfield that also has compliant features. Desirably, the system and method produces both the compliant flowfield features and the support structure of the adjacent diffusion media in a same plating operation.

SUMMARY OF THE INVENTION

In concordance with the instant disclosure, an efficient system and method for producing a flowfield having compliant features, and that produces both the compliant flowfield features and support structure of the diffusion media in a same plating operation, is surprisingly discovered.

In a first embodiment, a method for fabricating a flowfield for a fuel cell includes the step of providing a substrate and a plurality of radiation sources configured to generate a plurality of radiation beams. A radiation-sensitive material is disposed on the substrate. An imaging mask is placed between the plurality of radiation sources and the radiation-sensitive material, the imaging mask having a plurality of substantially radiation-transparent apertures. The substantially radiation-transparent apertures include a first portion and a second portion. The first portion of the apertures is configured to shape the radiation beams from the radiation sources to form a plurality of truss elements in the radiation-sensitive material. The second portion of the apertures is configured to shape the radiation beams from the radiation sources to form a plurality of wall elements in the radiation-sensitive material. The radiation-sensitive material is exposed to the plurality of radiation beams through the first portion of the radiation-transparent apertures and the second portion of the radiation-transparent apertures in the imaging mask. The plurality of truss elements and the plurality of wall elements are thereby formed in the radiation-sensitive material. The truss elements form a plurality of trusses configured to support an adjacent diffusion medium layer. The wall elements define a fluid path along a length of the substrate.

In another embodiment, a method for fabricating a flowfield for a fuel cell includes the step of providing a substrate and a plurality of radiation sources configured to generate a plurality of radiation beams. A radiation-sensitive material is disposed on the substrate. An imaging mask is placed between the plurality of radiation sources and the radiation-sensitive material, the imaging mask having a plurality of substantially radiation-transparent apertures. The substantially radiation-transparent apertures include a first portion and a second portion. The first portion of the apertures is configured to shape the radiation beams from the radiation sources to form a plurality of truss elements in the radiation-sensitive material. The second portion of the apertures is configured to shape the radiation beams from the radiation sources to form a plurality of wall elements in the radiation-sensitive material. A blocking mask is placed between the imaging mask and the plurality of radiation sources. The blocking mask has a plurality of substantially radiation-opaque sections. The substantially radiation-opaque sections are configured to cast a plurality of shadows and selectively militate against the radiation beams from the radiation sources forming at least one of the wall elements in the radiation-sensitive material. The blocking mask also permits the radiation beams from the radiation sources to form the truss elements in the radiation-sensitive material. The radiation-sensitive material is exposed to the plurality of radiation beams through the first portion of the radiation-transparent apertures and the second portion of the radiation-transparent apertures in the imaging mask. The plurality of truss elements and the plurality of wall elements are thereby formed in the radiation-sensitive material. The truss elements form a plurality of trusses configured to support an adjacent diffusion medium layer, and the wall elements define a fluid path along a length of the substrate.

In a further embodiment, a method for fabricating a flowfield for a fuel cell includes the step of providing a substrate and a plurality of radiation sources configured to generate a plurality of radiation beams. The plurality of radiation sources includes a first radiation source, a second radiation source, a third radiation source, and a fourth radiation source. The radiation sources are spaced apart from one another above an imaging mask. A radiation-sensitive material is disposed on the substrate. The imaging mask is placed between the plurality of radiation sources and the radiation-sensitive material. The imaging mask has a plurality of substantially radiation-transparent apertures. The substantially radiation-transparent apertures include a first portion and a second portion. The first portion of the apertures is configured to shape the radiation beams from the radiation sources to form a plurality of truss elements in the radiation-sensitive material. The second portion of the apertures is configured to shape the radiation beams from the radiation sources to form a plurality of wall elements in the radiation-sensitive material. A blocking mask is placed between the imaging mask and the plurality of radiation sources. The blocking mask has a plurality of substantially radiation-opaque sections. The substantially radiation-opaque sections are configured to cast a plurality of shadows and selectively prevent the radiation beams from the radiation sources from forming at least one of the wall elements in the radiation-sensitive material, while permitting the radiation beams from the radiation sources to form the truss elements in the radiation-sensitive material. The radiation-sensitive material is exposed to the plurality of radiation beams through the first portion of the radiation-transparent apertures and the second portion of the radiation-transparent apertures in the imaging mask. The radiation-sensitive material is exposed to the plurality of radiation beams from the first radiation source, the plurality of radiation beams from the second radiation source, the plurality of radiation beams from the third radiation source, and the plurality of radiation beams from the fourth radiation source. The plurality of truss elements and the plurality of wall elements are thereby formed in the radiation-sensitive material. The truss elements form a plurality of trusses configured to support an adjacent diffusion medium layer, and the wall elements defining a fluid path along a length of the substrate. The radiation beams from the first radiation source form a plurality of first truss elements. The radiation beams from the second radiation source form a plurality of second truss elements. The radiation beams from the third radiation source form a plurality of third truss elements. The radiation beams from the fourth radiation source form a plurality of fourth truss elements. One of the first truss elements, one of the second truss elements, one of the third truss elements, and one of the fourth truss elements intersects at a one of a plurality of nodes between the substrate and the imaging mask to form one of the trusses. The radiation beams from the first radiation source that would otherwise form a plurality of first wall elements are blocked by the blocking mask. The radiation beams from the second radiation source that would otherwise form a plurality of second wall elements are blocked by the blocking mask. The radiation beams from the third radiation source form a plurality of third wall elements. The radiation beams from the fourth radiation source that would otherwise form a plurality of fourth wall elements are blocked by the blocking mask. The flowfield for the fuel cell is thereby formed.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the order of the steps presented is exemplary in nature, and thus, is not necessary or critical.

Figure 1:
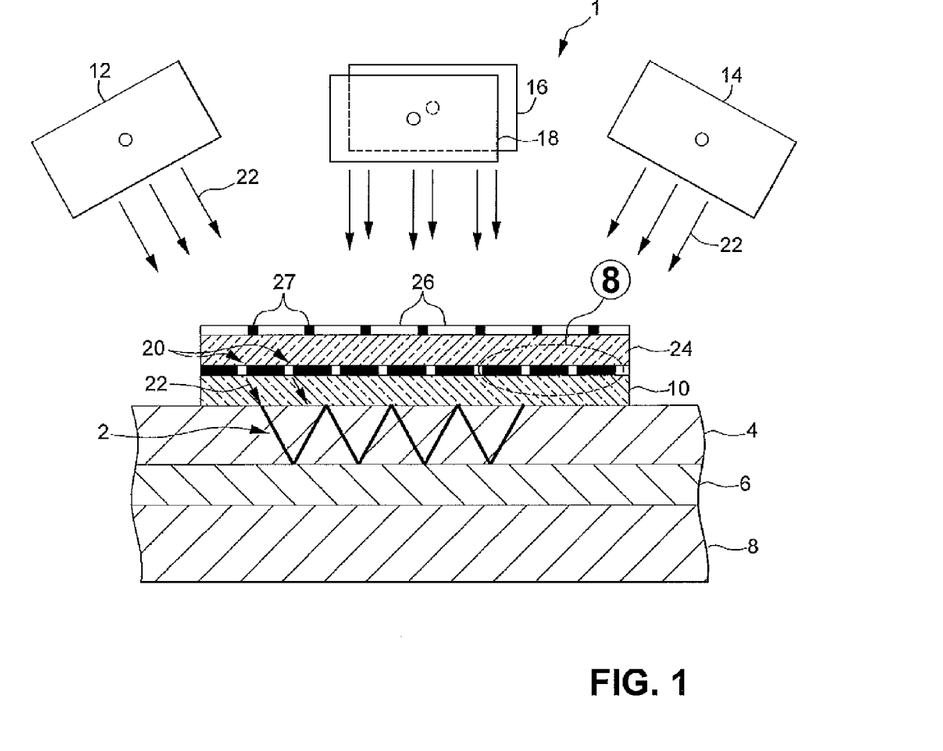
FIG. 1 is a schematic, fragmentary side elevational sectional view of an imaging mask, a blocking mask, a plurality of radiation sources, and a radiation-sensitive material, further showing exposure of the radiation-sensitive material to radiation beams from the radiation sources.
Figure 2A:
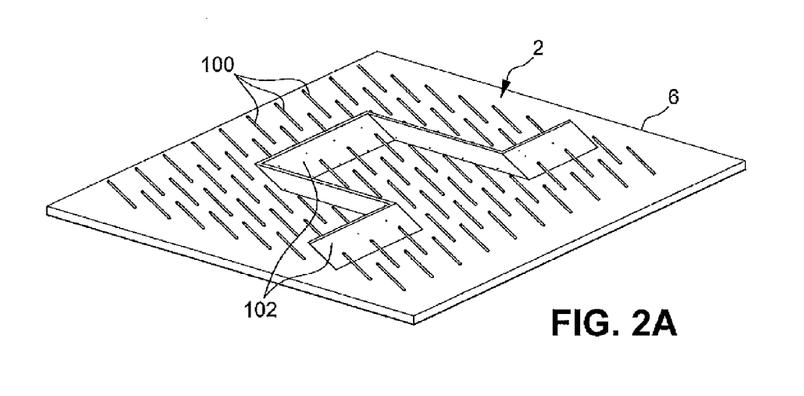
FIGS. 2A-2D illustrate a stepwise formation of a flowfield by exposure to radiation beams, the flowfield shown in a fragmentary, top perspective view.
Figure 2B:
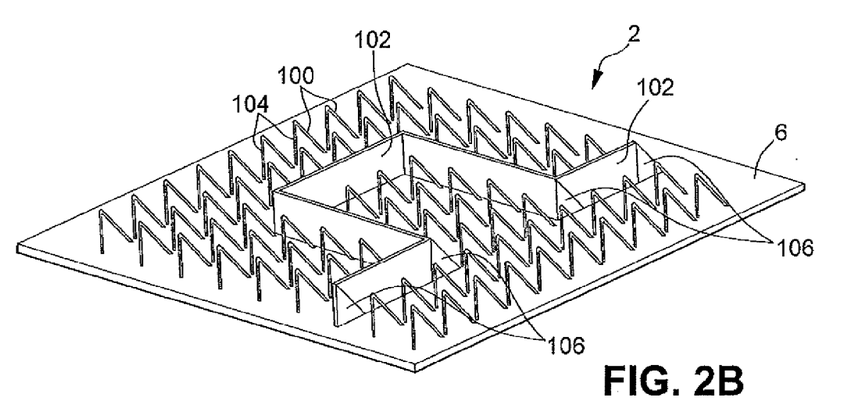
Figure 2C:
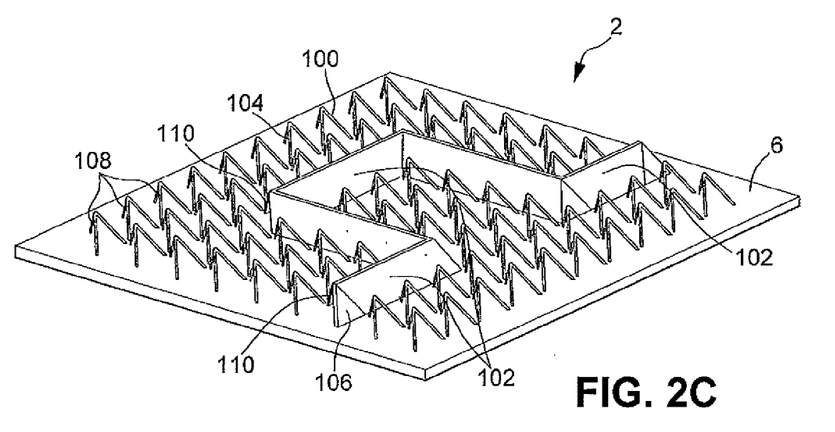
Figure 2D:
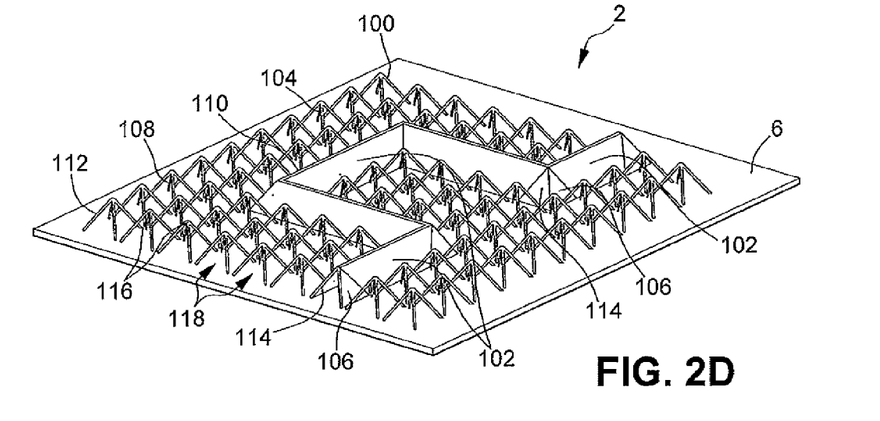

The present disclosure includes a system 1 for fabricating a flowfield 2 for a fuel cell (not shown) from a radiation-sensitive material 4. Although described herein with respect to fuel cells, it should be appreciated that the flowfield 2 may be employed in other applications such as water vapor transport devices and heat exchangers, as nonlimiting examples. As schematically shown in FIG. 1, the flowfield 2 is formed on a substrate 6. The substrate 6 may be formed from any material that permits the formation of polymeric structures thereon. As nonlimiting examples, the substrate 6 may be electrically nonconductive such as plastic, or electrically conductive such as stainless steel. Other materials for the substrate 6 may also be used. The substrate may be disposed on a working surface 8 such as a stationary base plate during the fabrication process.

The radiation-sensitive material 4 is disposed on the substrate 6. An imaging mask 10 is disposed between at least one radiation source 12, 14, 16, 18 and the radiation-sensitive material 4. The at least one radiation source 12, 14, 16, 18 may include a first radiation source 12, a second radiation source 14, a third radiation source 16, and a fourth radiation source 18, for example. The radiation sources 12, 14, 16, 18 may be spaced apart from one another above the imaging mask 10.

Suitable types of the radiation-sensitive material 4 and the at least one radiation source 12, 14, 16, 18 are described in Assignee's co-pending U.S. patent application Ser. Nos. 12/339,308, 12/341,062, 12/341,105, 12/603,147, 12/466,646, 12/466,405, and 12/603,120, the entire disclosures of which are hereby incorporated herein by reference. One of ordinary skill in the art should understand that other radiation sensitive materials 4 and radiation sources 12, 14, 16, 18 may also be used within the scope of the present disclosure.

The imaging mask 10 is provided with a plurality of substantially radiation-transparent apertures 20. Each of the first radiation source 12, the second radiation source 14, the third radiation source 16, and the fourth radiation source 18 may be configured to provide radiation beams 22 at different angles relative to a surface of the radiation-sensitive material 4. The radiation beams 22 may be collimated or non-collimated, as desired. In a particular embodiment, the radiation beams 22 are at least partially collimated. A skilled artisan should understand that fewer or more of the at least one radiation source 12, 14, 16, 18 may be employed, as desired.

The substantially radiation-transparent apertures 20 of the imaging mask 10 include a first portion configured to shape radiation beams 22 from the at least one radiation source 12, 14, 16, 18. The first portion creates desired structures such as truss elements 100, 104, 108, 112 (shown in FIGS. 2A-2D and 6A-6D) for the flowfield 2 from the radiation-sensitive material 4. The first portion of apertures 20 may be holes formed in the imaging mask 10, for example. Exemplary shapes for the first portion of the apertures 20 may include substantially circular holes, although other shapes may also be used.

The substantially radiation-transparent apertures 20 also include a second portion configured to shape the radiation beams 22 from the radiation sources 12, 14, 16, 18. The second portion creates desired structures such as wall elements 102, 106, 110, 114 (shown in FIGS. 2A-2D and 6A-6D, for example) in the radiation-sensitive material 4. Exemplary shapes for the second portion of apertures 20 may include elongate slots. A plurality of closely spaced circular apertures 124 (shown in FIG. 8) may also be employed to form the wall elements 102, 106, 110, 114 having a desired degree of flexibility. Other shapes for forming the wall elements 102, 106, 110, 114 may also be employed, as desired.

The imaging mask 10 may be shaped to conform to a desired surface of the radiation-sensitive material 4, or may extend along a single plane or multiple planes, as desired. In certain embodiments, the imaging mask 10 is stepped to form the flowfield 2 having regions with different thicknesses.

The system 1 may also employ a blocking mask 24 disposed in the optical path of the imaging mask 10 and the at least one radiation source 12, 14, 16, 18. The blocking mask 24 may be disposed between the imaging mask 10 and the at least one radiation source 12, 14, 16, 18, for example. It should be appreciated, however, that the imaging mask 10 can be above the blocking mask 24 when a well collimated radiation source is employed. The blocking mask 24 is provided with a plurality of substantially radiation-transparent openings 26. The blocking mask 24 advantageously has a plurality of substantially radiation-opaque sections 27. The blocking mask 24 is configured to selectively militate against the radiation beams 22 reaching the imaging mask 10 and, subsequently, the radiation-sensitive material 4. A variety of different blocking masks 24 may advantageously be employed with a single imaging mask 10, in order to provide a variety of desired radiation-cured structures.

One of ordinary skill should understand that the imaging mask 10 has the smaller, or no more than equal sized, apertures 20 relative to the openings 26 of the blocking mask 24. The difference in size between the apertures 20 and the openings 26 makes perfect alignment of the imaging mask 10 and the blocking mask 24 unnecessary.

The present disclosure includes a method for forming the flowfield 2 using the system 1 described hereinabove. Although the steps of the method are described and shown sequentially for purpose of clarity, it should be understood that the steps of exposing the radiation-sensitive material 4 to the plurality of radiation beams 22 are advantageously performed simultaneously. The simultaneous exposure of the radiation-sensitive material 4 to the plurality of radiation beams 22 from the plurality of radiation sources 12, 14, 16, 18, desirably maintains feature alignment during production of the flowfield 2.

With reference to FIGS. 2A-2D, the method according to one embodiment of the present disclosure includes the step of exposing the radiation-sensitive material 4 to the plurality of radiation beams 22 from one of the plurality of radiation sources 12, 14, 16, 18. The radiation-sensitive material 4 is exposed to the plurality of radiation beams 22 through the first portion of the radiation-transparent apertures 20 and the second portion of the radiation transparent apertures 20 in the imaging mask 10. In this embodiment, the blocking mask 24 is not employed. The radiation beams 22 are shaped by the imaging mask 10 having the first portion and the second portion of apertures 20.

In a particular example, the radiation beams 22 from the first radiation source 12 through the imaging mask 10 form a plurality of first truss elements 100 and a plurality of first wall elements 102. The exposure of the radiation-sensitive material 4 to the plurality of radiation beams 22 through the imaging mask 10, but from different ones of the plurality of radiation sources 12, 14, 16, 18, is likewise performed. The result of the various exposure steps includes the formation of second truss elements 104 and second wall elements 106 by radiation beams 22 from the second radiation source 14, third truss elements 108 and third wall elements 110 by radiation beams 22 from the third radiation source 16, and fourth truss elements 112 and fourth wall elements 114 by radiation beams 22 from the fourth radiation source 18, respectively.

Each of the first truss elements 100, the second truss elements 104, the third truss elements 108, and the fourth truss elements 112 intersect at one of a plurality of nodes 116 to form a plurality of trusses 118 within the flowfield 2. The trusses 118 are preferably compressible. The trusses 118 are configured to support an adjacent diffusion medium layer (not shown). At least one of the first wall elements 102, the second wall elements 106, the third wall elements 110, and the fourth wall elements 114 cooperate to define a flow path along the flowfield 2 for a fluid such as a fuel cell reactant. The fluid flow path is formed between the trusses 118 and along a length of the substrate 6. The fluid flow path defined by the at least one of the first wall elements 102, the second wall elements 106, the third wall elements 110, and the fourth wall elements 114 may be linear or tortuous along the length of the substrate. Other fluid flow path configurations may also be employed within the scope of the present disclosure.

Figure 3:
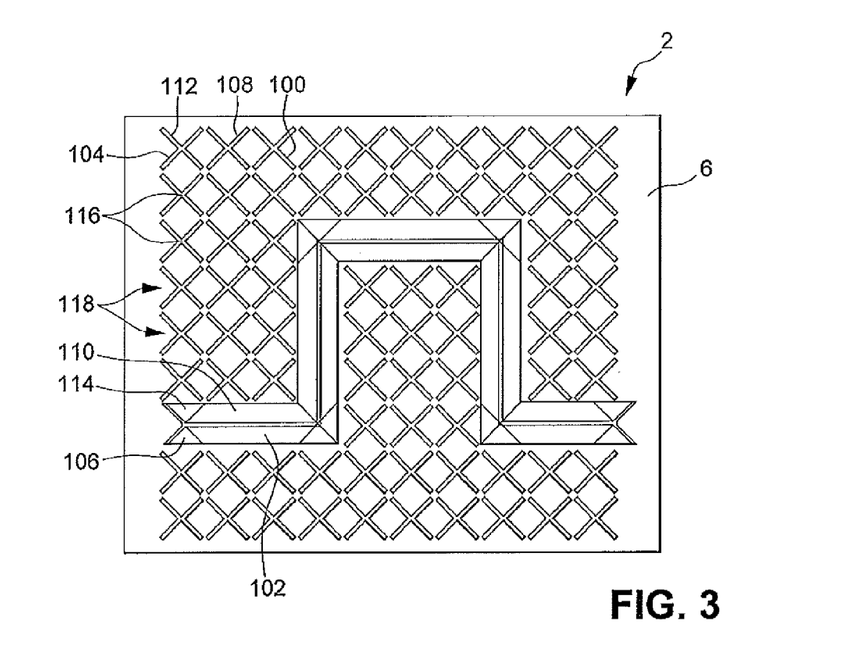
FIG. 3 is a fragmentary, top plan view of the flowfield formed according to the steps illustrated in FIGS. 2A-2D, the flowfield formed without a blocking mask.

Since the method shown in FIGS. 2A-2D is performed without the blocking mask 24, it should be appreciated the resulting flowfield 2 (shown in FIG. 3), may have an amount of excess or "trapped" cured radiation-sensitive material 4 following fabrication of the flowfield 2. The resulting flowfield 2 may also have "redundant" wall elements 102, 106, 110, 114 that are not necessary for sufficient fluid flow across the flowfield 2.

With reference to FIGS. 6A-6D, the method of the present disclosure may further include a step of placing the blocking mask 24 between the imaging mask 10 and the plurality of radiation sources 12, 14, 16, 18. The radiation-opaque sections 27 of the blocking mask 24 are configured to cast a plurality of shadows 120 and selectively block the radiation beams 22 from the radiation sources 12, 14, 16, 18. Preferably, the plurality of shadows 120 militate against a formation of at least one of the redundant wall elements 102, 106, 110, 114, while permitting the radiation beams 22 from the radiation sources 12, 14, 16, 18 to form the truss elements 100, 104, 108, 112 in the radiation-sensitive material 4. The blocking mask 24 may thereby be employed to minimize the amount of the excess cured radiation-sensitive material 4 formed during fabrication of the flowfield 2.

The blocking mask 24 may be laminated to the imaging mask 10, for example, as shown in FIG. 1. It has surprisingly been found that the radiation-opaque sections 27, disposed at distance from about one-fourth (¼) of an average vertical node height to about three-fourths (¾) of an average vertical node height of the trusses 116, facilitates the minimized formation of excess cured radiation-sensitive material 4 without substantially affecting the formation of adjacent truss elements 100, 104, 108, 112.

Figure 4:
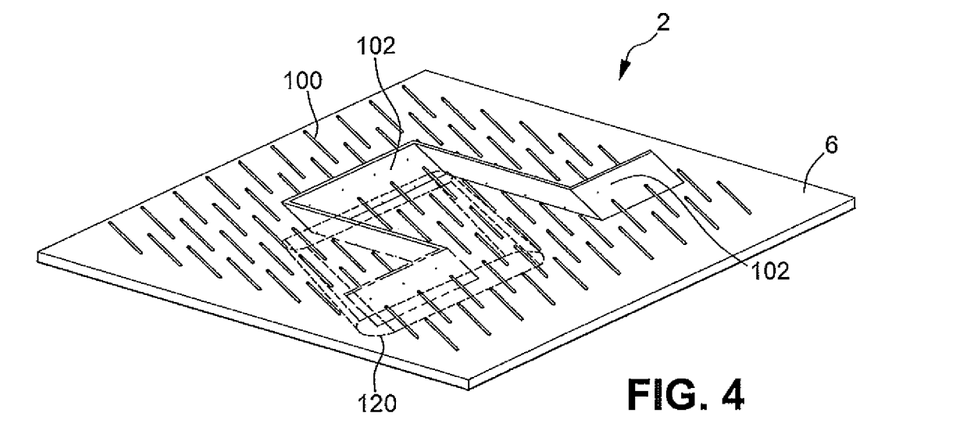
FIG. 4 is a fragmentary, top perspective view of a flowfield formed by exposure to radiation beams collimated to plus/minus 3 degrees (+/−3°) from a first one of the radiation sources shown in FIG. 1, shown with the plus three degree (+3°) shadow cast by a blocking mask and militating against formation of a wall of the flowfield.
Figure 5:
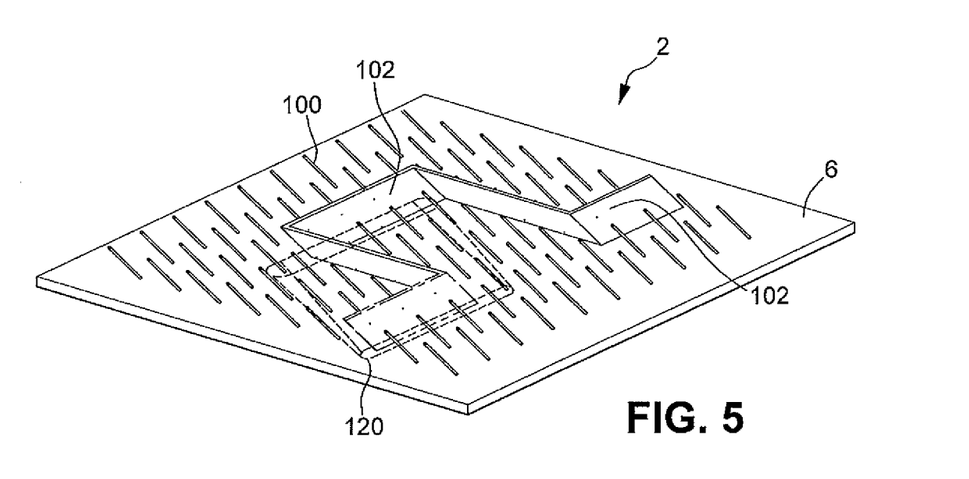
FIG. 5 is a fragmentary, top perspective view of a flowfield formed by exposure to radiation beams from the same first one of the radiation sources shown in FIG. 1, shown with the minus three degree (−3°) shadow cast by a blocking mask and militating against formation of a wall of the flowfield.

As shown in FIGS. 4-5, where the radiation beams 22 from the radiation sources 12, 14, 16, 18 are at least partially collimated, a lateral contraction or a lateral expansion of the shadows 120 cast by the blocking mask 24 may occur between the mask 24 and radiation-sensitive material 4. As a nonlimiting example, the radiation beams 22 may be collimated to within either plus three degrees (3°) or minus three degrees (−3°). The shadows 120 cast by the blocking mask 24 may thereby expand laterally from the blocking mask 24 at an angle of up to about three degrees, or contract laterally from the blocking mask 24 at an angle of up to about three degrees, depending on the degree of radiation collimation. It should be understood that radiation sources 12, 14, 16, 18 providing other degrees of radiation collimation may also be used. Where the degree of radiation collimation is known, it should also be understood that the placement of the blocking mask 24 relative to the radiation-sensitive material 4 may be selected to minimize the affect on adjacent truss elements 100, 104, 108, 112 and selected ones of the wall elements 102, 106, 110, 114.

Figure 6A:
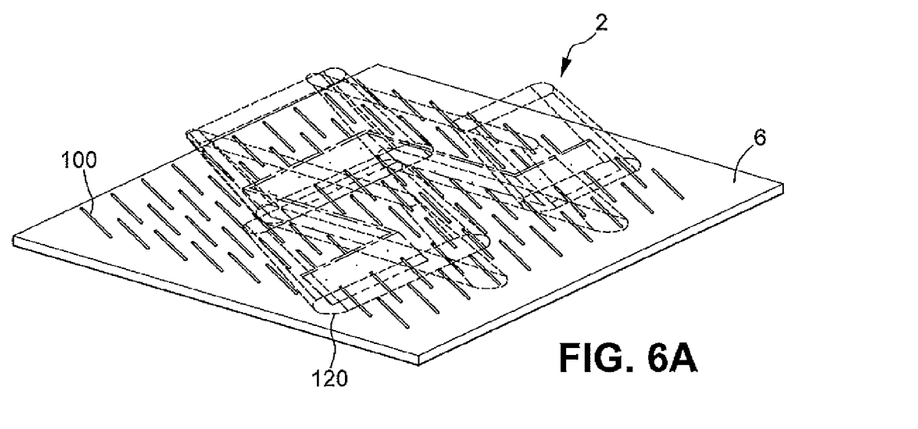
FIGS. 6A-6D illustrate a stepwise formation of a flowfield by exposure to radiation beams, the flowfield shown in a fragmentary, top perspective view with a plurality of shadows cast by a blocking mask and militating against formation of a select plurality of walls of the flowfield.
Figure 6B:
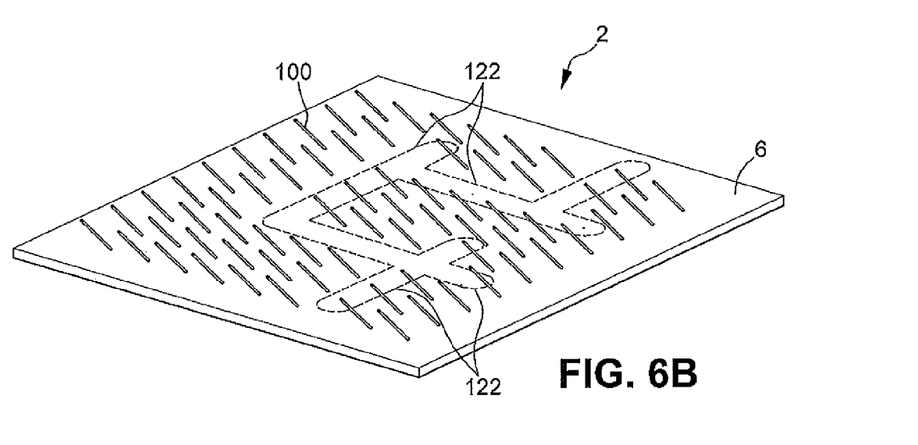
Figure 6C:
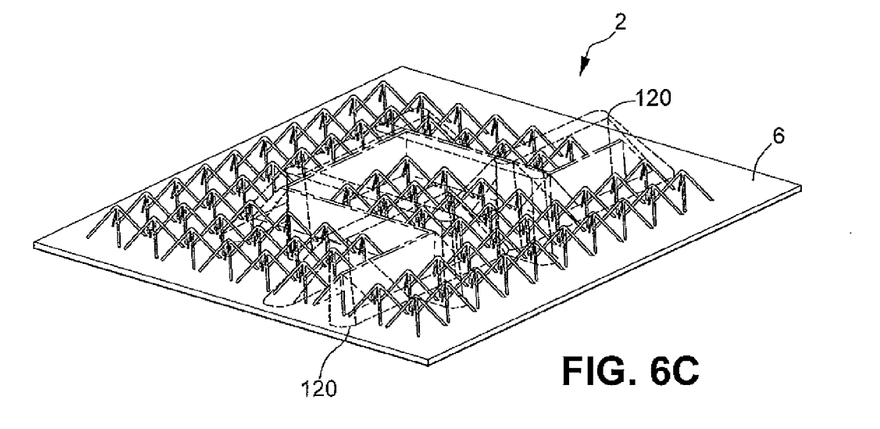
Figure 6D:
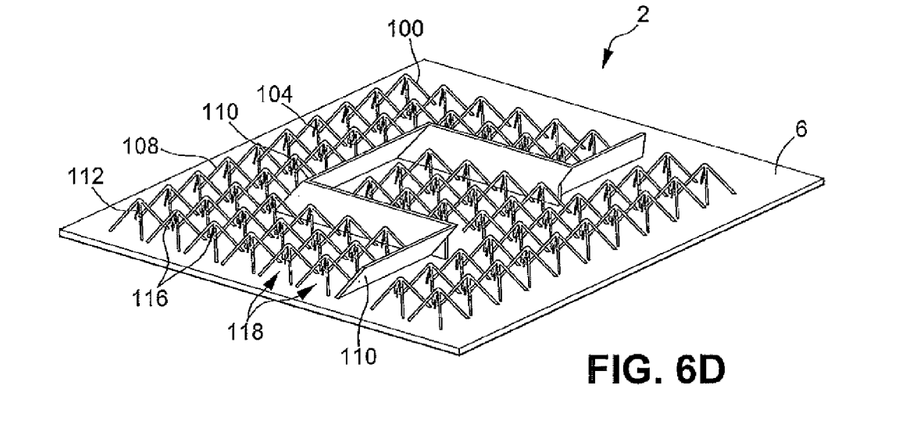
Figure 7:
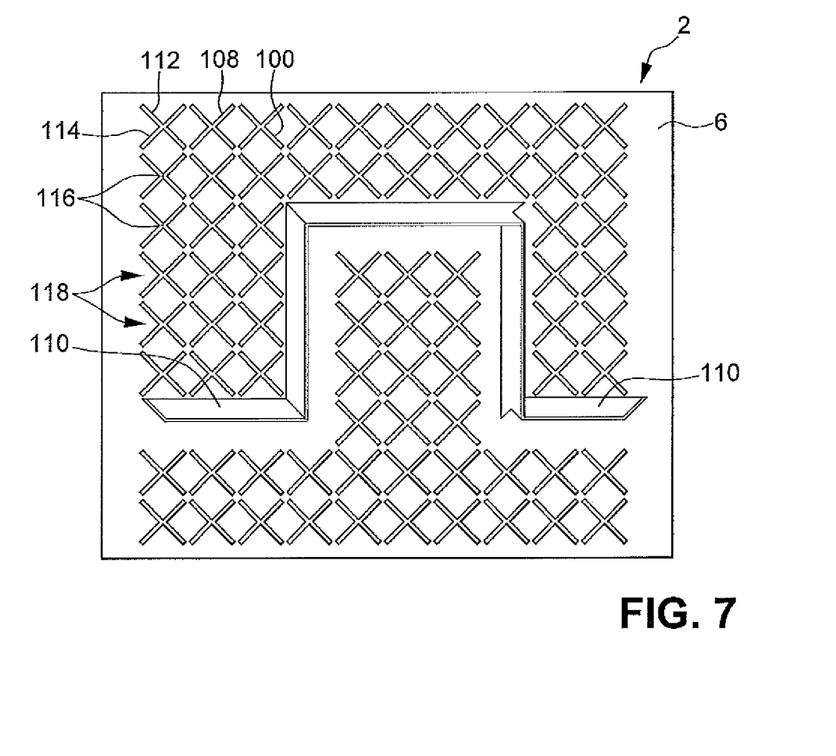
FIG. 7 is a fragmentary, top plan view of the flowfield shown in FIGS. 6A-6D, the flowfield formed with the blocking mask.

With renewed reference to FIGS. 6A-6D, the radiation-sensitive material 4 is exposed to the plurality of radiation beams 22 from one of the plurality of radiation sources 12, 14, 16, 18. The radiation beams 22 are shaped by the imaging mask 10 and form the first, second, third and fourth truss elements 100, 104, 108, 112. The blocking mask 24 prevents the radiation beams 22 from reaching desired areas 122 of the radiation-sensitive material 4, for example, as shown in FIG. 6B. The blocking mask 24 thereby casts the plurality of shadows 120 onto the surface of the radiation-sensitive material 4. For example, the shadows 120 may permit the formation of the first, second, third, and fourth truss elements 100, 104, 108, 112 for the trusses 118, while permitting formation of only the third wall elements 110. As illustrated in FIG. 7, the flowfield 2 with minimized formation of excess cured radiation-sensitive material 4 or redundant walls 102, 106, 110, 114 may thereby be fabricated.

One of ordinary skill in the art should appreciate that other constructs such as grids, columns, alternate truss configurations, and the like may be formed alongside the trusses 118 by like cooperation of the imaging mask 10 and the blocking mask 24, as desired.

Figure 8:
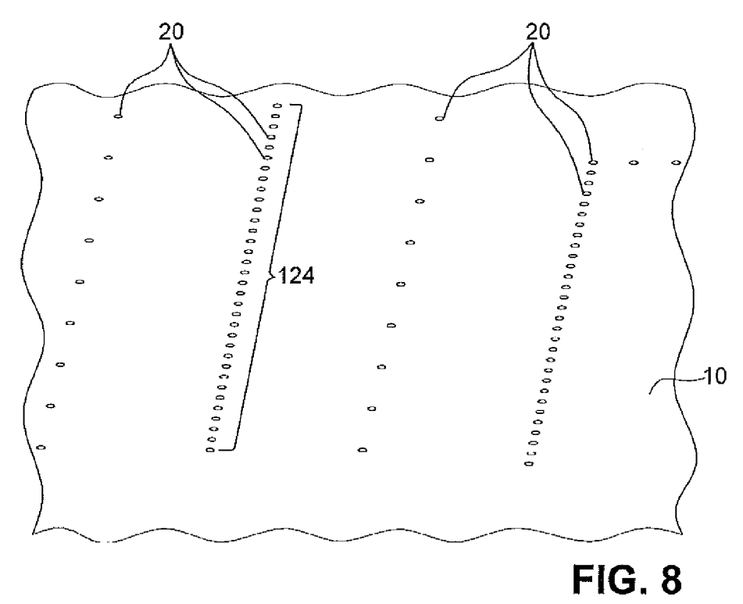
FIG. 8 is a fragmentary, top perspective view of an exemplary imaging mask with a plurality of closely spaced apertures, for use in forming a flexible wall element.
Figure 9:
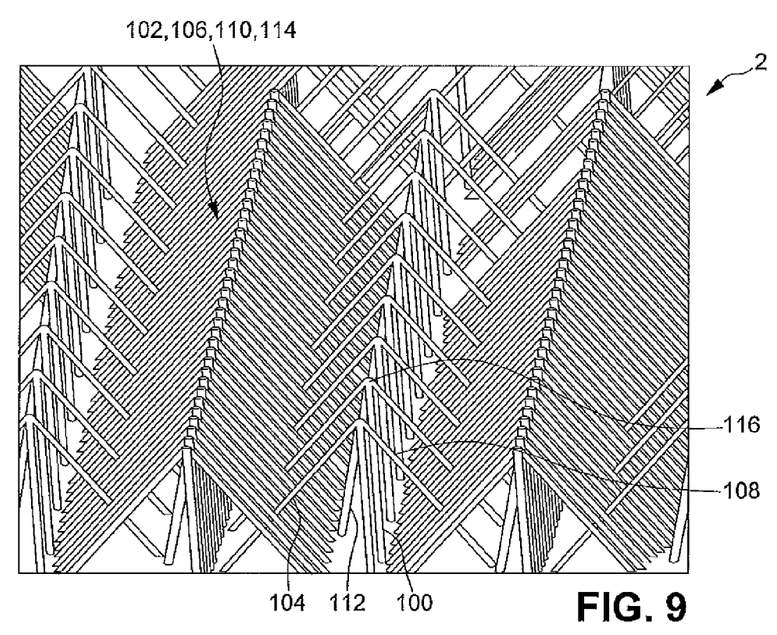
FIG. 9 is a fragmentary, top perspective view of a flowfield formed according to another embodiment of the disclosure, having walls formed by a plurality of closely spaced truss elements.
Figure 10:
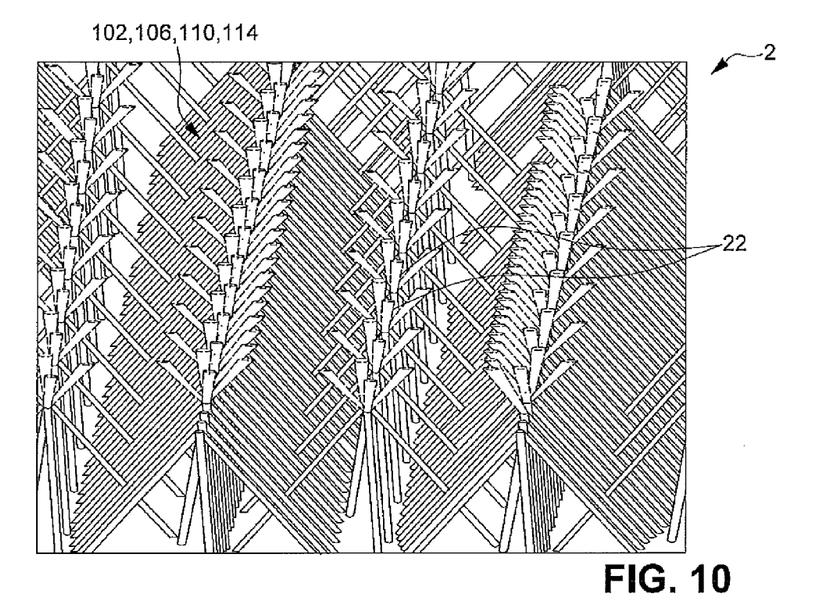
FIG. 10 is a fragmentary, top perspective view of the flowfield shown in FIG. 9, further showing radiation paths traced back toward the radiation sources shown in FIG. 1.
Figure 11:
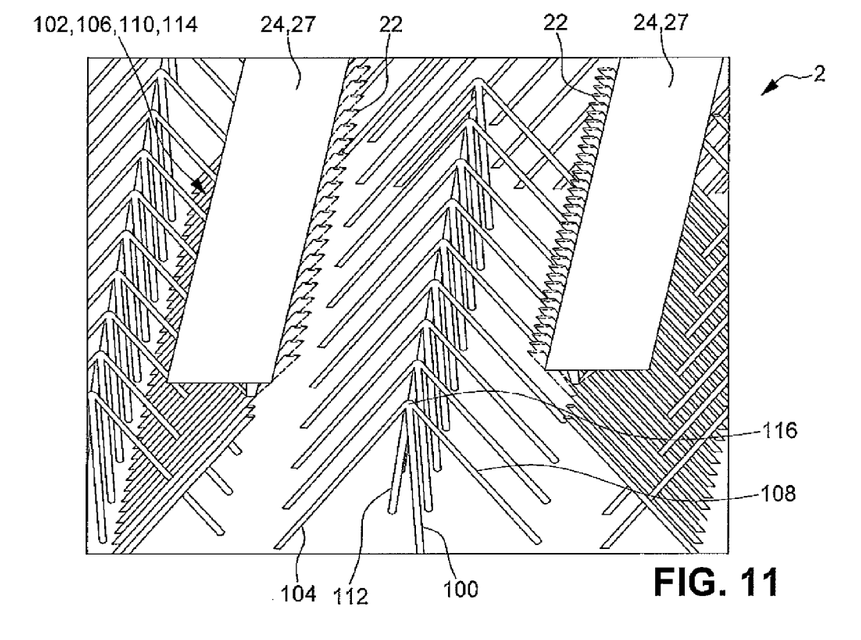
FIG. 11 is a fragmentary, top perspective view of the flowfield shown in FIG. 10, further showing a portion of a blocking mask covering all areas where structure formation is undesired, and not interfering with any desired radiation path.
Figure 12:
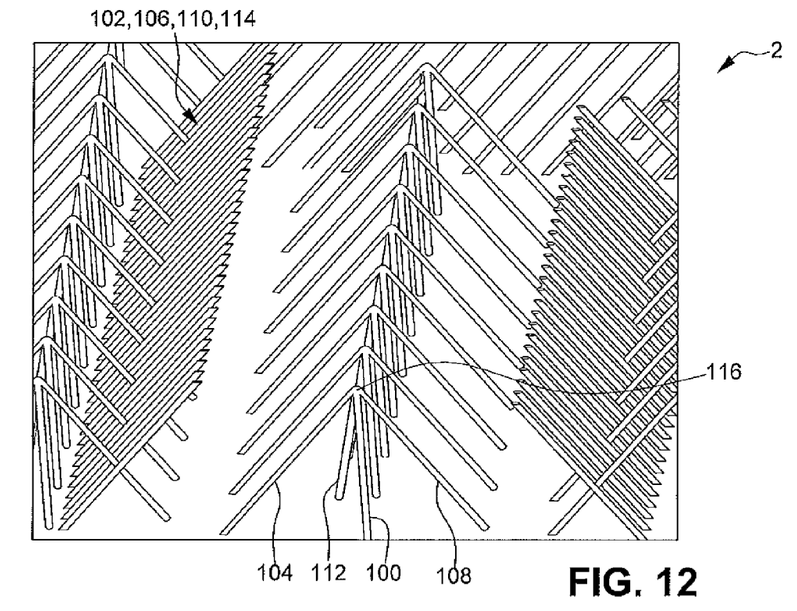
FIG. 12 is a fragmentary, top perspective view of the flowfield shown in FIGS. 9-11.
Figure 13:
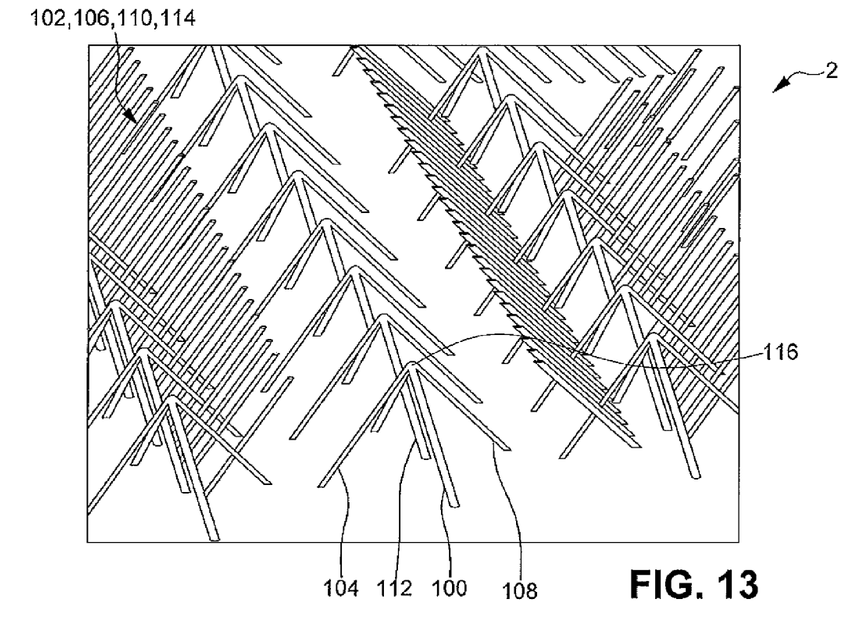
FIG. 13 is another fragmentary, top perspective view of the flowfield shown in FIGS. 9-11.

A further embodiment of the disclosure is shown in FIGS. 8-15. The method may include a step of providing the imaging mask 10 with a portion 124 of apertures 20 that are closely spaced together, for example, as shown in FIG. 8. Due to radiation collimation, which may result in a tapering of the radiation beams 22 as shown in FIG. 10, the apertures 20 may be formed larger in the imaging mask 10 than the desired image projected on the surface of the radiation-sensitive material 4 itself. If the degree of radiation collimation results in an enlargement of the radiation beams 22, the apertures 20 may be formed smaller in the imaging mask 10 than the desired image. The closely spaced portion 124 of the second portion of apertures 20 may be used instead of elongate slots to form one of the wall elements 102, 106, 110, 114 of the flowfield 2. Advantageously, the wall elements 102, 106, 110, 114 formed via the portion of closely spaced apertures 124 are generally more flexible than solid structure wall elements 102, 106, 110, 114 formed via elongate slots.

As described hereinabove, the blocking mask 24 may be selectively placed above the imaging mask 10 in order to block the radiation beams 22 that would otherwise form excess cured radiation-sensitive material 4 or redundant wall elements 102, 106, 110, 114 in the flowfield 2. Like the apertures 20 formed in the imaging mask 10, the substantially radiation-opaque sections 27 of the blocking mask 24 may be formed larger or smaller than the desired shadows 24 to be cast, in order to account for different degrees of radiation collimation. The blocking mask 24 is desirably placed in a position that permits the formation of the truss elements 100, 104, 108, 112 adjacent the fluid flow path, for example, as illustrated in FIGS. 11-15.

Figure 14:
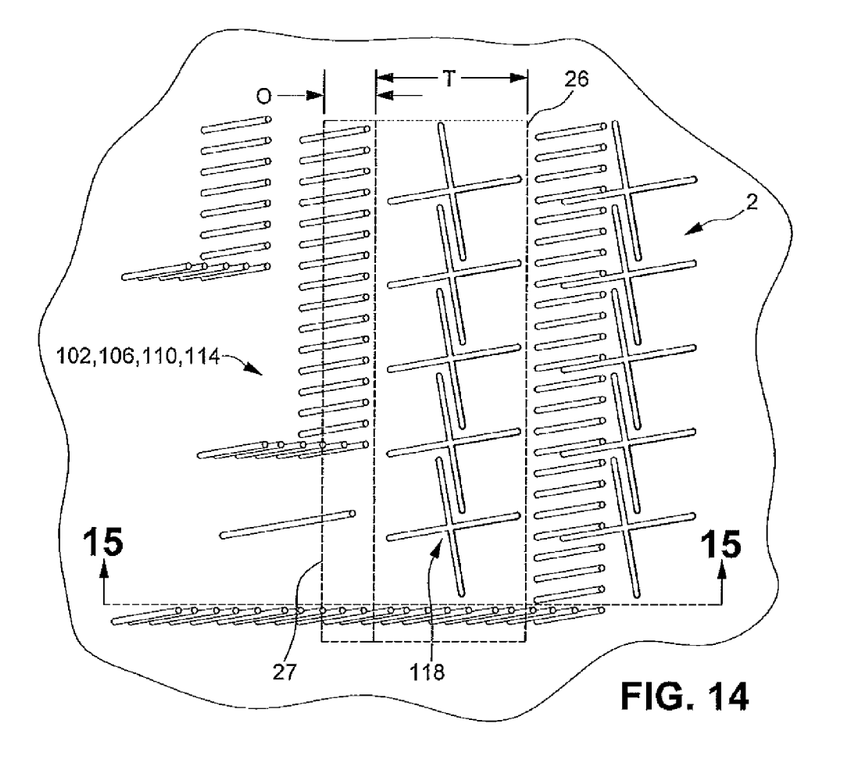
FIG. 14 is a fragmentary, top plan view of the flowfield shown in FIGS. 9-13, further showing the relative widths of the radiation-opaque sections and the radiation-transparent apertures.
Figure 15:
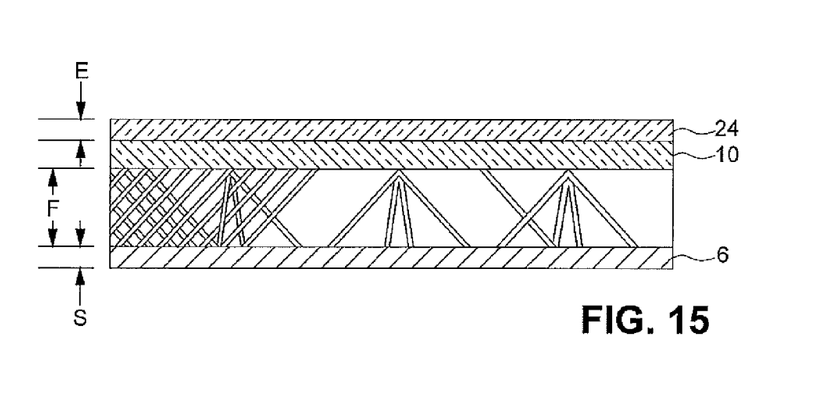
FIG. 15 is a fragmentary, cross-sectional side elevational view of the flowfield shown in FIG. 14 and taken along section line 15-15.

In an illustrative embodiment shown in FIGS. 14 and 15, a width O of the substantially radiation-opaque sections 27 of the blocking mask 24 may be less than about one-half a width T of the substantially radiation-transparent openings 26. A thickness F of the flowfield 2 may be roughly six times greater than a thickness S of the substrate 6, atop which the flowfield 2 is formed. As also shown in FIG. 15, the blocking mask 24 may be disposed at an elevation E. The elevation E may be a distance above the imaging mask 10 that is equal to approximately one-third of the vertical node height. The vertical node height may be indicated by thickness F in FIG. 15, as a nonlimiting example.

The method of the present disclosure further includes the step of removing an uncured volume of the radiation-sensitive material 4 following fabrication of the flowfield 2, for example, by washing the flowfield 2 with a suitable solvent. The flowfield 2 may then be at least one of coated with the electrically conductive material such as metal, or coated with a metal oxide or ceramic. The flowfield 2 may also be carbonized, if desired, within the scope of the present disclosure.

Advantageously, the present method permits an efficient fabrication of the flowfield 2 having compliant features. The method also produces both the compliant features of the flowfield 2 and surrounding support structure such as the trusses 118 for adjacent diffusion media in a same plating operation.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for fabricating a flowfield, the method comprising the steps of:
    providing a substrate;
    providing a plurality of radiation sources configured to generate a plurality of radiation beams;
    disposing a radiation-sensitive material on the substrate;
    placing an imaging mask between the plurality of radiation sources and the radiation-sensitive material, the imaging mask having a plurality of substantially radiation-transparent apertures, the substantially radiation-transparent apertures including a first portion and a second portion, the first portion of the apertures configured to shape the radiation beams from the radiation sources to form a plurality of truss elements in the radiation-sensitive material, and the second portion of the apertures configured to shape the radiation beams from the radiation sources to form a plurality of wall elements in the radiation-sensitive material; and
    exposing the radiation-sensitive material to the plurality of radiation beams through the first portion of the radiation-transparent apertures and the second portion of the radiation-transparent apertures in the imaging mask, to form the plurality of truss elements and the plurality of wall elements in the radiation-sensitive material, the truss elements forming a plurality of trusses configured to support an adjacent diffusion medium layer, and the wall elements disposed between the plurality of trusses and defining a fluid path along a length of the substrate.

2. The method of claim 1, wherein the first portion of the apertures includes substantially circular holes formed in the imaging mask, and the second portion of the apertures includes elongate slots formed in the imaging mask.

3. The method of claim 1, wherein the second portion of the apertures is a plurality of closely spaced circular holes formed in the imaging mask.

4. The method of claim 1, wherein the steps of exposing the radiation-sensitive material and forming the truss elements and the wall elements occur substantially simultaneously.

5. The method of claim 1, wherein the plurality of radiation sources includes a first radiation source, a second radiation source, a third radiation source, and a fourth radiation source, the radiation sources spaced apart from one another above the imaging mask.

6. The method of claim 5, wherein the step of exposing the radiation-sensitive material to the plurality of radiation beams includes exposing the radiation-sensitive material to the plurality of radiation beams from the first radiation source, exposing the radiation-sensitive material to the plurality of radiation beams from the second radiation source, exposing the radiation-sensitive material to the plurality of radiation beams from the third radiation source, and exposing the radiation-sensitive material to the plurality of radiation beams from the fourth radiation source.

7. The method of claim 6, wherein the radiation beams from the first radiation source form a plurality of first truss elements, the radiation beams from the second radiation source form a plurality of second truss elements, the radiation beams from the third radiation source form a plurality of third truss elements, and the radiation beams from the fourth radiation source form a plurality of fourth truss elements, one of the first truss elements, one of the second truss elements, one of the third truss elements, and one of the fourth truss elements intersecting at a node between the substrate and the imaging mask to form one of the trusses.

8. The method of claim 7, wherein the radiation beams from the first radiation source form a plurality of first wall elements, the radiation beams from the second radiation source form a plurality of second wall elements, the radiation beams from the third radiation source form a plurality of third wall elements, and the radiation beams from the fourth radiation source form a plurality of fourth wall elements, at least one of each of the first wall elements, the second wall elements, the third wall elements, and the fourth wall elements cooperating to form the fluid path between the trusses and along a length of the substrate.

9. The method of claim 8, wherein the fluid path defined by the wall elements is a tortuous path along the length of the substrate.

10. The method of claim 1, further comprising a step of placing a blocking mask in the optical path of the imaging mask and the plurality of radiation sources, the blocking mask having a plurality of substantially radiation-opaque sections, the substantially radiation-opaque sections configured to cast a plurality of shadows and selectively militate against the radiation beams from the radiation sources forming at least one of the wall elements in the radiation-sensitive material while permitting the radiation beams from the radiation sources to form the truss elements in the radiation-sensitive material.

11. The method of claim 10, wherein the radiation-opaque sections of the blocking mask are spaced from the imaging mask at a distance from about one-fourth ($\frac{1}{4}$) of an average vertical node height of the trusses to about three-fourths ($\frac{3}{4}$) of an average vertical node height of the trusses.

12. The method of claim 10, wherein the blocking mask is laminated to the imaging mask.

13. The method of claim 10, wherein the radiation beams from the radiation sources are at least partially collimated.

14. The method of claim 13, wherein the radiation beams are collimated to within one of plus and minus three degrees (+/−3°).

15. The method of claim 13, wherein the shadows expand laterally from the blocking mask at an angle of up to about three degrees (+3°).

16. The method of claim 13, wherein the shadows contract laterally from the blocking mask at an angle of up to about three degrees (−3°).

17. The method of claim 10, wherein the plurality of radiation sources includes a first radiation source, a second radiation source, a third radiation source, and a fourth radiation source, the radiation sources spaced apart from one another from the imaging mask, wherein the step of exposing the radiation-sensitive material to the plurality of radiation beams includes exposing the radiation-sensitive material to the plurality of radiation beams from the first radiation source, exposing the radiation-sensitive material to the plurality of radiation beams from the second radiation source, exposing the radiation-sensitive material to the plurality of radiation beams from the third radiation source, and exposing the radiation-sensitive material to the plurality of radiation beams from the fourth radiation source, wherein the radiation beams from the first radiation source form a plurality of first truss elements, the radiation beams from the second radiation source form a plurality of second truss elements, the radiation beams from the third radiation source form a plurality of third truss elements, and the radiation beams from the fourth radiation source form a plurality of fourth truss elements, one of the first truss elements, one of the second truss elements, one of the third truss elements, and one of the fourth truss elements intersecting at a one of a plurality of nodes between the substrate and the imaging mask to form a plurality of the trusses, wherein the radiation beams from the first radiation source that would otherwise form a plurality of first wall elements are blocked by the blocking mask, the radiation beams from the second radiation source that would otherwise form a plurality of second wall elements are blocked by the blocking mask, the radiation beams from the third radiation source form a plurality of third wall elements, and the radiation beams from the fourth radiation source that would otherwise form a plurality of fourth wall elements are blocked by the blocking mask, the third wall elements cooperating to form a fluid path between the trusses and along a length of the substrate.

18. The method of claim 1, further comprising the steps of removing an uncured portion of the radiation-sensitive material following the formation of the trusses and the walls.

19. A method for fabricating a flowfield, the method comprising the steps of:
providing a substrate;
providing a plurality of radiation sources configured to generate a plurality of radiation beams;
disposing a radiation-sensitive material on the substrate;
placing an imaging mask between the plurality of radiation sources and the radiation-sensitive material, the imaging mask having a plurality of substantially radiation-transparent apertures, the substantially radiation-transparent apertures including a first portion and a second portion, the first portion of the apertures configured to shape the radiation beams from the radiation sources to form a plurality of truss elements in the radiation-sensitive material, and the second portion of the apertures configured to shape the radiation beams from the radiation sources to form a plurality of wall elements in the radiation-sensitive material;
placing a blocking mask in the optical path of the imaging mask and the plurality of radiation sources, the blocking mask having a plurality of substantially radiation-opaque sections, the substantially radiation-opaque sections configured to cast a plurality of shadows and selectively block the radiation beams from the radiation sources from forming at least one of the wall elements in the radiation-sensitive material while permitting the radiation beams from the radiation sources to form the truss elements in the radiation-sensitive material; and
exposing the radiation-sensitive material to the plurality of radiation beams through the first portion of the radiation-transparent apertures and the second portion of the radiation-transparent apertures in the imaging mask to form the plurality of truss elements and the plurality of wall elements in the radiation-sensitive material, the truss elements forming a plurality of trusses configured to support an adjacent diffusion medium layer, and the wall elements defining a fluid path along a length of the substrate.

20. A method for fabricating a flowfield, the method comprising the steps of:
providing a substrate;
providing a plurality of radiation sources configured to generate a plurality of radiation beams, wherein the plurality of radiation sources includes a first radiation source, a second radiation source, a third radiation source, and a fourth radiation source, the radiation sources spaced apart from one another above the imaging mask;
disposing a radiation-sensitive material on the substrate;
placing an imaging mask between the plurality of radiation sources and the radiation-sensitive material, the imaging mask having a plurality of substantially radiation-transparent apertures, the substantially radiation-transparent apertures including a first portion and a second portion, the first portion of the apertures configured to shape the radiation beams from the radiation sources to form a plurality of truss elements in the radiation-sensitive material, and the second portion of the apertures configured to shape the radiation beams from the radiation sources to form a plurality of wall elements in the radiation-sensitive material;
placing a blocking mask in the optical path of the imaging mask and the plurality of radiation sources, the blocking mask having a plurality of substantially radiation-opaque sections, the substantially radiation-opaque sections configured to cast a plurality of shadows and selectively block the radiation beams from the radiation sources from forming at least one of the wall elements in the radiation-sensitive material while permitting the radiation beams from the radiation sources to form the truss elements in the radiation-sensitive material; and
exposing the radiation-sensitive material to the plurality of radiation beams through the first portion of the radiation-transparent apertures and the second portion of the radiation-transparent apertures in the imaging mask, including exposing the radiation-sensitive material to the plurality of radiation beams from the first radiation source, exposing the radiation-sensitive material to the plurality of radiation beams from the second radiation source, exposing the radiation-sensitive material to the plurality of radiation beams from the third radiation source, and exposing the radiation-sensitive material to the plurality of radiation beams from the fourth radiation source to form the plurality of truss elements and the plurality of wall elements in the radiation-sensitive material, the truss elements forming a plurality of trusses configured to support an adjacent diffusion medium layer, and the wall elements defining a fluid path along a length of the substrate,
wherein the radiation beams from the first radiation source form a plurality of first truss elements, the radiation beams from the second radiation source form a plurality of second truss elements, the radiation beams from the third radiation source form a plurality of third truss elements, and the radiation beams from the fourth radiation source form a plurality of fourth truss elements, one of the first truss elements, one of the second truss elements, one of the third truss elements, and one of the fourth truss elements intersecting at a node between the substrate and the imaging mask to form one of the trusses,
wherein the radiation beams from the first radiation source that would otherwise form a plurality of first wall elements are blocked by the blocking mask, the radiation beams from the second radiation source that would otherwise form a plurality of second wall elements are blocked by the blocking mask, the radiation beams from the third radiation source form a plurality of third wall elements, and the radiation beams from the fourth radiation source that would otherwise form a plurality of fourth wall elements are blocked by the blocking mask.

* * * * *